(12) United States Patent
Yoshida et al.

(10) Patent No.: US 11,879,040 B2
(45) Date of Patent: Jan. 23, 2024

(54) RESIN PARTICLES COMPRISING A BIODEGRADABLE RESIN AND A SPECIFIC AMOUNT OF A METAL ELEMENT

(71) Applicant: FUJIFILM Business Innovation Corp., Tokyo (JP)

(72) Inventors: Kazusei Yoshida, Kanagawa (JP); Masahiro Oki, Kanagawa (JP); Hideaki Yoshikawa, Kanagawa (JP); Kenji Yao, Kanagawa (JP); Tetsuya Taguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 296 days.

(21) Appl. No.: 17/505,647

(22) Filed: Oct. 20, 2021

(65) Prior Publication Data

US 2022/0306818 A1     Sep. 29, 2022

(30) Foreign Application Priority Data

Mar. 26, 2021     (JP) ................................ 2021-054285

(51) Int. Cl.
| | | |
|---|---|---|
| *C08L 101/16* | (2006.01) | |
| *C08J 3/12* | (2006.01) | |
| *C08J 7/04* | (2020.01) | |
| *C08K 5/11* | (2006.01) | |
| *C08L 1/14* | (2006.01) | |
| *C08L 39/02* | (2006.01) | |
| *C08L 79/02* | (2006.01) | |
| *C08L 91/06* | (2006.01) | |

(52) U.S. Cl.
CPC ............... *C08J 3/126* (2013.01); *C08J 7/042* (2013.01); *C08K 5/11* (2013.01); *C08L 1/14* (2013.01); *C08L 39/02* (2013.01); *C08L 79/02* (2013.01); *C08L 91/06* (2013.01); *C08L 2201/06* (2013.01); *Y10T 428/2993* (2015.01)

(58) Field of Classification Search
CPC ......... Y10T 428/2982; Y10T 428/2992; Y10T 428/2998; C08L 1/10; C08L 101/16
See application file for complete search history.

(56) References Cited

U.S. PATENT DOCUMENTS

| | | | |
|---|---|---|---|
| 2013/0184415 A1* | 7/2013 | Yoshikawa | ........... C08L 101/16 525/450 |
| 2020/0179261 A1 | 6/2020 | Kobayashi et al. | |
| 2021/0403660 A1* | 12/2021 | Oki | ........ A61K 8/0241 |
| 2022/0306842 A1* | 9/2022 | Oki | ........... C08L 1/12 |

FOREIGN PATENT DOCUMENTS

| | | | | |
|---|---|---|---|---|
| BR | 102020003074 A2 | * | 8/2021 | ................ C08L 3/02 |
| EP | 3932974 | | 1/2022 | |
| EP | 3943530 | | 1/2022 | |
| EP | 4006083 | | 6/2022 | |
| EP | 4062898 | | 9/2022 | |
| EP | 4063431 | | 9/2022 | |
| JP | 2004210848 | | 7/2004 | |
| JP | 2004256579 | | 9/2004 | |
| JP | 2012077245 | | 4/2012 | |
| WO | 2020188698 | | 9/2020 | |

OTHER PUBLICATIONS

Translation BR-102020003074 A2 (Year: 2020).*
Translation CN-111548536A (Year: 2020).*
"Office Action of Europe Counterpart Application", dated Feb. 1, 2023, pp. 1-4.
"Search Report of Europe Counterpart Application", dated Jun. 1, 2022, p. 1-p. 8.

* cited by examiner

*Primary Examiner* — Hoa (Holly) Le
(74) *Attorney, Agent, or Firm* — JCIPRNET

(57) ABSTRACT

Resin particles include mother particles containing a biodegradable resin and a plasticizer, in which an amount of a metal element having an ionic valence of 2 or more, obtained by fluorescent X-ray analysis, is 0.002% by mass or more and 2.0% by mass or less with respect to a total amount of the resin particles.

20 Claims, No Drawings

RESIN PARTICLES COMPRISING A BIODEGRADABLE RESIN AND A SPECIFIC AMOUNT OF A METAL ELEMENT

CROSS-REFERENCE TO RELATED APPLICATIONS

This application is based on and claims priority under 35 USC 119 from Japanese Patent Application No. 2021-054285 filed Mar. 26, 2021.

BACKGROUND

(i) Technical Field

The present invention relates to resin particles.

(ii) Related Art

JP2012-077245A suggests "a biodegradable resin composition including a poorly hydrolyzable biodegradable resin (A), polyglycolic acid (B), and ester decomposition accelerator aid (C) consisting of inorganic particles that accelerate hydrolysis of the polyglycolic acid".

JP2004-210848A suggests "a method for producing resin coated particles obtained by coating a surface in which resin particles having an average particle size of 0.01 μm or more and 1,000 μm or less are dispersed or immersed in an aqueous solution containing Ca ions and phosphate ions at a temperature of 30° C. or higher for 12 hours or longer with a layer made of calcium phosphate".

SUMMARY

Aspects of non-limiting embodiments of the present disclosure relate to resin particles including mother particles containing a biodegradable resin and a plasticizer, the resin particles in which a phenomenon of the plasticizer exuding from the resin particles in a case of storage for a long period of time under a high temperature condition (hereinafter, "phenomenon of the plasticizer exuding from the resin particles" is referred to as "bleeding") is suppressed while maintaining flexibility, compared to a case where an amount of a metal element having an ionic valence of 2 or more, obtained by fluorescent X-ray analysis, is less than 0.002% by mass or exceeds 2.0% by mass with respect to a total amount of the resin particles, a case where a ratio (Rs/Rp) of a circle-equivalent diameter Rs of an aggregate to a circle-equivalent diameter Rp of a primary particle, after storage for 3 months under a condition of 50° C. and 50% RH, is 1.5 or more, or a case where a durometer hardness is 75 or more.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The object is addressed by the following means.

According to an aspect of the present disclosure, there are provided resin particles including mother particles containing a biodegradable resin and a plasticizer, in which an amount of a metal element having an ionic valence of 2 or more, obtained by fluorescent X-ray analysis, is 0.002% by mass or more and 2.0% by mass or less with respect to a total amount of the resin particles.

DETAILED DESCRIPTION

Hereinafter, exemplary embodiments of the present invention will be described. These descriptions and examples illustrate embodiments and do not limit the scope of the invention.

In the numerical value range described stepwise in the present specification, an upper limit value or a lower limit value described in one numerical value range may be substituted with an upper limit value or a lower limit value of another numerical value range described stepwise. In addition, in the numerical value range described in the present specification, the upper limit value or the lower limit value of the numerical value range may be substituted with the value shown in the examples.

Each component may contain a plurality of substances. In a case of referring to an amount of each component in a composition, in a case where the plurality of substances corresponding to each component is present in the composition, unless otherwise specified, the amount means a sum of the plurality of substances present in the composition.

In the present specification, the term of "step" is included in the present term as long as an intended purpose of the step is achieved not only as an independent step but also in a case where the step is not clearly distinguished from other steps.

Resin Particles

Resin particles according to a first embodiment include mother particles containing a biodegradable resin and a plasticizer, in which an amount of a metal element having an ionic valence of 2 or more (hereinafter, "metal element having an ionic valence of 2 or more" is referred to as "specific metal element"), obtained by fluorescent X-ray analysis, is 0.002% by mass or more and 2.0% by mass or less with respect to a total amount of the resin particles.

Due to the configuration, the resin particles according to the first embodiment suppress bleeding in a case of storage for a long period of time under a high temperature condition while maintaining flexibility. The reason is presumed as follows.

In order to improve the flexibility of the resin particles containing a biodegradable resin (hereinafter, also simply referred to as biodegradable resin particles), addition of a plasticizer is effective. However, in a case where the biodegradable resin particles containing a plasticizer are stored for a long period of time under a high temperature condition, bleeding easily occurs, and aggregation of the biodegradable resin particles easily occurs.

In the resin particles according to the first embodiment, an amount of a specific metal element, obtained by fluorescent X-ray analysis, is 0.002% by mass or more and 2.0% by mass or less with respect to the total amount of the resin particles. The specific metal element easily binds to a functional group (for example, a hydroxyl group, a carboxyl group, and the like) of the biodegradable resin. Therefore, the specific metal element easily has a crosslinked structure with the biodegradable resin. In this regard, bleeding of the plasticizer contained in the resin particles is suppressed. By setting the amount of the specific metal element within the above numerical value range, many of the crosslinked structures are easily present within a range not impairing the flexibility of the resin particles.

From the above, it is presumed that the resin particles according to the first embodiment suppress bleeding in a case of storage for a long period of time under a high temperature condition while maintaining flexibility.

Resin particles according to a second embodiment include mother particles containing a biodegradable resin and a plasticizer.

In addition, a ratio (Rs/Rp) of a circle-equivalent diameter Rs of an aggregate to a circle-equivalent diameter Rp of a primary particle after storage for 3 months under a condition of 50° C. and 50% RH is less than 1.5.

The durometer hardness is less than 75.

Here, the "aggregate" is secondary particles formed by aggregating two or more resin particles which are primary particles.

Due to the configuration, the resin particles according to the second embodiment suppress bleeding in a case of storage for a long period of time under a high temperature condition while maintaining flexibility. The reason is presumed as follows.

In the resin particles according to the second embodiment, a ratio (Rs/Rp) of the circle-equivalent diameter Rs of the aggregate to the circle-equivalent diameter Rp of the primary particle after storage for 3 months under the condition of 50° C. and 50% RH is less than 1.5. The matter that the ratio (Rs/Rp) is less than 1.5 indicates that the aggregate of the primary particles is unlikely to occur even in a case of storage for a long period of time under a high temperature condition. The aggregation of primary particles even in a case of storing resin particles containing a plasticizer for a long period of time under a high temperature condition tends to be caused by exudation of the plasticizer from the resin particles. That is, the matter that the ratio (Rs/Rp) is less than 1.5 means that bleeding is suppressed in a case of storage for a long period of time under a high temperature condition.

In addition, the resin particles according to the second embodiment have a durometer hardness of less than 75, which means that the resin particles have flexibility.

From the above, it is presumed that the resin particles according to the second embodiment suppress bleeding in a case of storage for a long period of time under a high temperature condition while maintaining flexibility.

Hereinafter, both of the resin particles according to the first or second embodiment will be described in detail. However, an example of the resin particles of the present invention may be resin particles corresponding to any one of the resin particles according to the first or second embodiment.

Mother Particles
Biodegradable Resin

Mother particles contain a biodegradable resin.

Examples of the mother particles include particles containing a biodegradable resin as a major component, and specific examples thereof include 90% by mass, 95% by mass, 98% by mass, or 100% by mass of the biodegradable resin with respect to the total amount of the mother particles.

Here, the biodegradable resin is a resin that is decomposed into water and carbon dioxide by microorganisms. Specifically, the biodegradable resin means a resin in which the biodegradation rate under aerobic conditions measured by a method in accordance with ISO-14855-2 (2018) is 50% or more in one month.

Examples of the biodegradable resin include cellulose acylate, polyester, natural polymers, and the like.

Cellulose acylate is a cellulose derivative in which at least a part of hydroxy groups in cellulose is substituted (acylated) with an acyl group. The acyl group is a group having a structure of —CO—R$^4$c (R$^4$C represents a hydrogen atom or a hydrocarbon group). Examples of the cellulose acylate include a cellulose derivative represented by General Formula (CA).

Examples of the polyester include an aliphatic polyester, an aliphatic aromatic polyester, and the like.

Examples of the aliphatic polyester include polyhydroxyalkanoic acid such as polylactic acid (PLA), polyglycolic acid (PGA) polyhydroxybutyrate, poly (3-hydroxybutyrate-co-3-hydroxyhexanoate) (PHBH), polycaprolactone, polybutylene succinate (PBS), polybutylene succinate/adipate (PBSA), and polyethylene succinate (PBA); and the like.

Examples of the aliphatic aromatic polyester include polybutylene adipate/terephthalate copolymer resin (PBAH), polytetramethylene adipate/terephthalate copolymer resin, and the like.

Examples of natural polymers include starch, cellulose, chitin, chitosan, gluten, gelatin, zein, soybean protein, collagen, keratin, and the like.

The biodegradable resin is, for example, preferably cellulose acylate.

Since cellulose acylate has a hydroxyl group in the main chain, there are many sites where a bond with a specific metal element is formed. Therefore, the number of cross-linked structures with the specific metal element easily increases, and the bleeding of the plasticizer is further suppressed.

Cellulose Acylate

Cellulose acylate is, for example, a cellulose derivative represented by General Formula (CA).

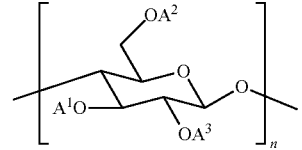

General Formula (CA)

In General Formula (CA), A1, A2, and A3 each independently represent a hydrogen atom or an acyl group, and n represents an integer of 2 or more. However, at least a part of n A1s, n A2s, or n A3s represents an acyl group. The n A1s in a molecule may be all the same, partially the same, or different from each other. Similarly, the n A2s and n A3s in the molecule may be all the same, partially the same, or different from each other.

In the acyl group represented by A1, A2, and A3, a hydrocarbon group in the acyl group may be linear, branched, or cyclic, but the acyl group is, for example, preferably linear or branched, and more preferably linear.

In the acyl group represented by A1, A2, and A3, a hydrocarbon group in the acyl group may be a saturated hydrocarbon group, or an unsaturated hydrocarbon group, but the acyl group is, for example, preferably a saturated hydrocarbon group.

The acyl group represented by A1, A2, and A3 is, for example, preferably an acyl group having 1 to 6 carbon atoms. That is, as the cellulose acylate, a cellulose acylate having an acyl group having 1 or more and 6 or less carbon atoms is, for example, preferable.

The acyl group represented by A1, A2, and A3 may be a group in which a hydrogen atom in the acyl group may be substituted with a halogen atom (for example, a fluorine atom, a bromine atom, an iodine atom), an oxygen atom, or a nitrogen atom, but is, for example, preferably not substituted.

Examples of the acyl group represented by A1, A2, and A3 include a formyl group, an acetyl group, a propionyl group, a butyryl group (butanoyl group), a propenoyl group, a hexanoyl group, and the like. Among these, the acyl group is, for example, preferably an acyl group having two or more and four or less carbon atoms, and more preferably an acyl group having two or three carbon atoms, from a viewpoint of improving the biodegradation rate of the resin particles.

Examples of the cellulose acylate include cellulose acetate (cellulose monoacetate, cellulose diacetate (DAC), cellulose triacetate), cellulose acetate propionate (CAP), cellulose acetate butyrate (CAB), and the like.

Cellulose acylate is, for example, preferably, cellulose acylate having two or more acyl groups, from a viewpoint of improving the biodegradation rate of the resin particles. Specifically, the cellulose acylate is, for example, preferably cellulose diacetate, cellulose acetate propionate (CAP), and cellulose acetate butyrate (CAB), and more preferably cellulose acetate propionate (CAP), from a viewpoint of improving the biodegradation rate of the resin particles.

As the cellulose acylate, at least one selected from the group consisting of cellulose diacetate, cellulose acetate propionate (CAP), and cellulose acetate butyrate (CAB) has a more appropriate range of the number of hydroxyl groups in the main chain, and with this, the resin particles easily have a crosslinked structure within a range that does not impair the flexibility of the resin particles. Therefore, the resin particles become resin particles in which bleeding in a case of storage for a long period of time under a high temperature condition is suppressed while maintaining more flexibility.

One cellulose acylate may be used alone, or two or more thereof may be used in combination.

A weight average polymerization degree of cellulose acylate is, for example, preferably 200 or more and 1,000 or less, more preferably 500 or more and 1,000 or less, and further more preferably 600 or more and 1,000 or less.

The weight average polymerization degree of cellulose acylate is obtained from a weight average molecular weight (Mw) by the following procedure.

First, the weight average molecular weight (Mw) of cellulose acylate is measured by gel permeation chromatography (GPC apparatus: HLC-8320GPC, manufactured by Tosoh Corporation, column: TSKgel α-M) in terms of polystyrene using tetrahydrofuran.

Subsequently, the polymerization degree of cellulose acylate is obtained by dividing by a structural unit molecular weight of cellulose acylate. For example, in a case where a substituent of cellulose acylate is an acetyl group, the structural unit molecular weight is 263 in a case where a substitution degree is 2.4, and 284 in a case where the substitution degree is 2.9.

A substitution degree of cellulose acylate is, for example, preferably 2.1 or more and 2.9 or less, more preferably 2.2 or more and 2.9 or less, further more preferably 2.3 or more and 2.9 or less, and particularly preferably 2.6 or more and 2.9 or less, from a viewpoint of improving the biodegradation rate of the resin particles.

In cellulose acetate propionate (CAP), a ratio of the substitution degree of the acetyl group to the propionyl group (acetyl group/propionyl group) is, for example, preferably 0.01 or more and 1 or less, and more preferably 0.05 or more and 0.1 or less, from a viewpoint of improving the biodegradation rate of the resin particles.

In cellulose acetate butyrate (CAB), a ratio of the substitution degree of the acetyl group to the butyryl group (acetyl group/butyryl group) is, for example, preferably 0.05 or more and 3.5 or less, and more preferably 0.5 or more and 3.0 or less, from a viewpoint of improving the biodegradation rate of the resin particles.

The substitution degree of cellulose acylate is an index indicating a degree to which a hydroxy group of cellulose is substituted with an acyl group. That is, the substitution degree is an index indicating a degree of acylation of cellulose acylate. Specifically, the substitution degree means an intramolecular average number of substitutions in which three hydroxy groups in a D-glucopyranose unit of cellulose acylate are substituted with acyl groups. The substitution degree is obtained from an integral ratio of peaks of cellulose-derived hydrogen and acyl group-derived hydrogen in 1H-NMR (JMN-ECA/manufactured by JEOL RESONANCE Inc.).

One biodegradable resin may be used alone, or a plurality of thereof may be used in combination.

Plasticizer

The mother particles contain a plasticizer.

Examples of the plasticizer include ester compound, cardanol compound, camphor, metal soap, polyol, polyalkylene oxide, and the like. The plasticizer is, for example, preferably at least one of an ester compound or a cardanol compound from a viewpoint of improving mechanical properties of the resin particles. One plasticizer may be used alone, or two or more thereof may be used in combination.

Examples of the ester compound include fatty acid ester (adipic acid ester, citric acid ester, sebacic acid ester, azelaic acid ester, phthalic acid ester, acetic acid ester), phosphoric acid ester, condensed phosphoric acid ester, glycol ester (for example, benzoic acid glycol ester) modified body of fatty acid ester (for example, epoxidized fatty acid ester), and the like. Examples of the ester include monoester, diester, triester, polyester, and the like. Among these, dicarboxylic acid diester (adipic acid diester, sebacic acid diester, azelaic acid diester, phthalic acid diester, and the like) is, for example, preferable.

The plasticizer is, for example, preferably at least one selected from the group consisting of adipic acid ester, citric acid ester, and sebacic acid ester. Adipic acid ester, citric acid ester, and sebacic acid ester have a high affinity for cellulose acylate, and by being dispersed in cellulose acylate in a state close to uniform, thermal fluidity is further improved as compared with other plasticizers.

As the adipic acid ester, a mixture of the adipic acid ester and components other than adipic acid ester may be used. Examples of commercially available products of the mixture include Daifatty101 manufactured by Daihachi Chemical Industry Co., Ltd., and the like.

Examples of fatty acid ester such as citric acid ester, sebacic acid ester, azelaic acid ester, phthalic acid ester, and acetic acid ester include esters of fatty acid and alcohol. Examples of the alcohol include monohydric alcohols such as methanol, ethanol, propanol, butanol, and 2-ethylhexanol; polyhydric alcohols such as glycerin, polyglycerin (diglycerin and the like), pentaerythritol, ethylene glycol, diethylene glycol, propylene glycol, butylene glycol, trimethylolpropane, trimethylolethane, and sugar alcohol; and the like.

Examples of the glycol in the benzoic acid glycol ester include ethylene glycol, diethylene glycol, propylene glycol, and the like.

The epoxidized fatty acid ester is an ester compound having a structure in which carbon-carbon unsaturated bond of the unsaturated fatty acid ester is epoxidized (that is, oxacyclopropane). Examples of the epoxidized fatty acid ester include esters of fatty acid and alcohol in which a part or all of the carbon-carbon unsaturated bonds in the unsaturated fatty acid (for example, oleic acid, palmitoleic acid, vaccenic acid, linoleic acid, linolenic acid, nervonic acid, and the like) is epoxidized. Examples of the alcohol include monohydric alcohols such as methanol, ethanol, propanol, butanol, and 2-ethylhexanol; polyhydric alcohols such as glycerin, polyglycerin (diglycerin and the like), pentaerythritol, ethylene glycol, diethylene glycol, propylene glycol, butylene glycol, trimethylolpropane, trimethylolethane, and sugar alcohol; and the like.

The ester compound as a plasticizer has a molecular weight (or weight average molecular weight) of, for example, preferably 200 or more and 2,000 or less, more preferably 250 or more and 1,500 or less, and further more preferably 280 or more and 1,000 or less. Unless otherwise specified, the weight average molecular weight of the ester compound is a value measured in accordance with a method for measuring the weight average molecular weight of cellulose acylate.

As the plasticizer, a cardanol compound is, for example, preferably used.

The cardanol compound refers to a component contained in a naturally-derived compound made from cashew (for example, a compound represented by Structural Formulae (b-1) to (b-4)) or a derivative from the component.

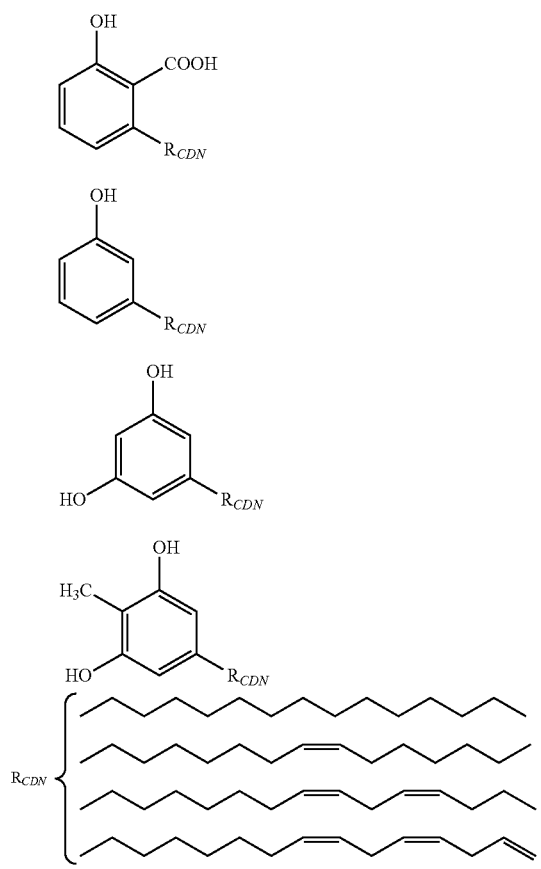

The cardanol compound may be a mixture of the naturally-derived compound made from cashew (hereinafter, also referred to as "cashew-derived mixture").

The cardanol compound may be a derivative from a cashew-derived mixture. Examples of the derivative from the cashew-derived mixture include the following mixtures or monomers, for example.

A mixture in which a composition ratio of each component in the cashew-derived mixture is adjusted A monomer obtained by isolating only specific components from a cashew-derived mixture A mixture that contains a modified body obtained by modifying the components in the cashew-derived mixture A mixture that contains a polymer obtained by polymerizing components in a cashew-derived mixture A mixture that contains a modified polymer obtained by modifying and polymerizing components in a cashew-derived mixture A mixture that contains a modified body obtained by further modifying components in the mixture having the adjusted composition ratio A mixture that contains a polymer obtained by further polymerizing the components in the mixture having the adjusted composition ratio A mixture that contains a modified polymer obtained by further modifying and polymerizing the components in the mixture having the adjusted composition ratio A modified body obtained by further modifying the isolated monomer A polymer obtained by further polymerizing the isolated monomer A modified polymer obtained by further modifying and polymerizing the isolated monomer Here, it is assumed that the monomer also includes multimers such as dimer and trimer The cardanol compound is, for example, preferably at least one compound selected from the group consisting of a compound represented by General Formula (CDN1) or a polymer obtained by polymerizing the compound represented by General Formula (CDN1), from a viewpoint of improving the biodegradation rate of the resin particles.

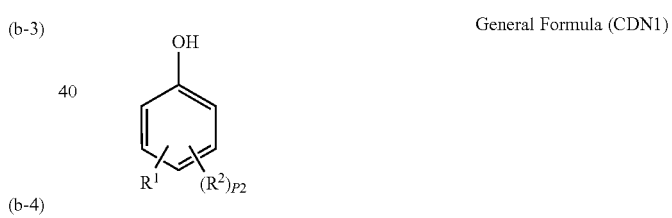

General Formula (CDN1)

In General Formula (CDN1), $R^1$ represents an alkyl group that may have a substituent or an unsaturated aliphatic group that has a double bond and may have a substituent. $R^2$ represents a hydroxy group, a carboxy group, an alkyl group that may have a substituent, or an unsaturated aliphatic group that has a double bond and may have a substituent. P2 represents an integer of 0 or more and 4 or less. $R^2$ present in plural numbers in a case where P2 is 2 or more may be the same groups or may be different groups.

In General Formula (CDN1), the alkyl group that may have a substituent represented by $R^1$ is, for example, preferably an alkyl group having 3 or more and 30 or less carbon atoms, more preferably an alkyl group having 5 or more and 25 or less carbon atoms, and further more preferably an alkyl group having 8 or more and 20 or less carbon atoms.

Examples of the substituent include a hydroxy group; a substituent containing an ether bond such as an epoxy group and a methoxy group; a substituent containing an ester bond such as an acetyl group and a propionyl group; and the like.

Examples of alkyl group that may have a substituent include a pentadecane-1-yl group, a heptane-1-yl group, an octane-1-yl group, a nonane-1-yl group, a decane-1-yl group, an undecane-1-yl group, a dodecane-1-yl group, a tetradecane-1-yl group, and the like.

In General Formula (CDN1), the unsaturated aliphatic group that has a double bond represented by $R^1$ and may have a substituent is, for example, preferably an unsaturated aliphatic group having 3 or more and 30 or less carbon atoms, more preferably an unsaturated aliphatic group having 5 or more and 25 or less carbon atoms, and further more preferably an unsaturated aliphatic group having 8 or more and 20 or less carbon atoms.

The number of double bonds included in the unsaturated aliphatic group is, for example, preferably 1 or more and 3 or less.

Examples of the substituent include the same as exemplified as the substituent of the alkyl group.

Examples of the unsaturated aliphatic group that has a double bond and may have a substituent include a pentadeca-8-ene-1-yl group, a pentadeca-8,11-diene-1-yl group, a pentadeca-8,11,14-triene-1-yl group, a pentadeca-7-ene-1-yl group, a pentadeca-7,10-diene-1-yl group, a pentadeca-7,10,14-triene-1-yl group, and the like.

In General Formula (CDN1), $R^1$ is, for example, preferably a pentadeca-8-ene-1-yl group, a pentadeca-8,11-diene-1-yl group, a pentadeca-8,11,14-triene-1-yl group, a pentadeca-7-ene-1-yl group, a pentadeca-7,10-diene-1-yl group, a pentadeca-7,10,14-triene-1-yl group, and the like.

In General Formula (CDN1), as an alkyl group that may have a substituent represented by $R^2$ and an unsaturated aliphatic group that has a double bond and may have a substituent, exemplified alkyl groups that may have a substituent represented by $R^1$ and unsaturated aliphatic groups that have a double bond and may have a substituent are similarly exemplified as, for example, preferable examples.

The compound represented by General Formula (CDN1) may be further modified. For example, the compound may be epoxidized, and from a viewpoint of improving the biodegradation rate of the resin particles, specifically, a compound of a structure in which a hydroxy group having a compound represented by General Formula (CDN1) has been substituted with the following group (EP), that is, a compound represented by General Formula (CDN1-e) is, for example, preferable.

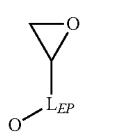

Group(EP)

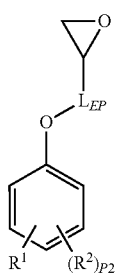

General Formula (CDN1-e)

In the group (EP) and General Formula (CDN1-e), $L_{EP}$ represents a single bond or a divalent linking group. In General Formula (CDN1-e), $R^1$, $R^2$, and P2 each are the same as $R^1$, $R^2$, and P2 in General Formula (CDN1).

In the group (EP) and General Formula (CDN1-e), examples of the divalent linking group represented by $L_{EP}$ include an alkylene group that may have a substituent (for example, preferably an alkylene group having 1 or more and 4 or less carbon atoms), more preferably an alkylene group having 1 carbon atom), a —CH$_2$CH$_2$OCH$_2$CH$_2$- group, and the like.

Examples of the substituent include the same as exemplified as the substituent in $R^1$ of General Formula (CDN1).

The $L_{EP}$ is, for example, preferably a methylene group.

A polymer obtained by polymerizing the compound represented by General Formula (CDN1) refers to a polymer obtained by polymerizing at least two or more compounds represented by General Formula (CDN1) via or not via a linking group.

Examples of the polymer obtained by polymerizing the compound represented by General Formula (CDN1) include a compound represented by General Formula (CDN2).

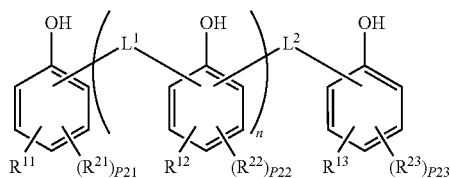

General Formula (CDN2)

In General Formula (CDN2), $R^{11}$, $R^{12}$, and $R^{13}$ each independently represent an alkyl group that may have a substituent, or an unsaturated aliphatic group that has a double bond and may have a substituent. $R^{21}$, $R^{22}$, and $R^{23}$ each independently represent a hydroxy group, a carboxy group, an alkyl group that may have a substituent, or an unsaturated aliphatic group that has a double bond and may have a substituent. P21 and P23 each independently represent an integer of 0 or more and 3 or less, and P22 represents an integer of 0 or more and 2 or less. $L^1$ and $L^2$ each independently represent a divalent linking group. n represents an integer of 0 or more and 10 or less. $R^{21}$ present in plural numbers in a case where P21 is 2 or more, $R^{22}$ present in plural numbers in a case where P22 is 2 or more, and $R^{23}$ present in plural numbers in a case where P23 is 2 or more may be each independently the same groups, or may be different groups. $R^{12}$, $R^{22}$, and $L^1$ present in plural numbers in a case where n is 2 or more may be each independently the same groups, or may be different groups, and P22 present in plural numbers in a case where n is 2 or more may be the same numbers, or may be different numbers.

In General Formula (CDN2), as an alkyl group that may have a substituent represented by $R^{11}$, $R^{12}$, $R^{13}$, $R^{21}$, $R^{22}$, and $R^{23}$ and an unsaturated aliphatic group that has a double bond and may have a substituent, exemplified $R^1$ of General Formula (CDN1) is similarly exemplified as, for example, a preferable example.

In General Formula (CDN2), examples of the divalent linking group represented by $L^1$ and $L^2$ include an alkylene group that may have a substituent (for example, preferably an alkylene group having 2 or more and 30 or less carbon atoms, more preferably an alkylene group having 5 or more and 20 or less carbon atoms), and the like.

Examples of the substituent include the same as exemplified as the substituent in $R^1$ of General Formula (CDN1).

In General Formula (CDN2), n is, for example, preferably 1 or more and 10 or less, and more preferably 1 or more and 5 or less.

The compound represented by General Formula (CDN2) may be further modified. For example, the compound may be epoxidized, and specifically, may be a compound of a structure in which a hydroxy group of the compound represented by General Formula (CDN2) has been substituted with a group (EP), that is, a compound represented by General Formula (CDN2-e).

General Formula (CDN2-e)

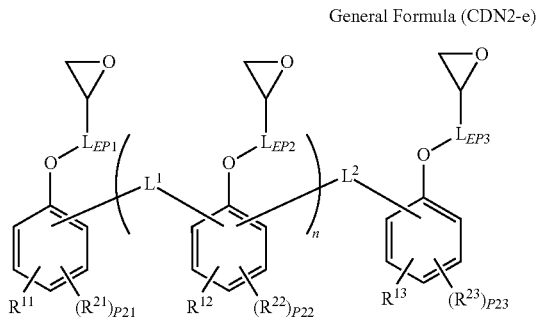

In General Formula (CDN2-e), $R^{11}$, $R^{12}$, $R^{13}$, $R^{21}$, $R^{22}$, $R^{23}$, P21, P22, P23, $L^1$, $L^2$, and n are each independently the same as $R^{11}$, $R^{12}$, $R^{13}$, $R^{21}$, $R^{22}$, $R^{23}$, P21, P22, P23, $L^1$, $L^2$, and n in General Formula (CDN2).

In General Formula (CDN2-e), $L_{EP1}$, $L_{EP2}$, and $L_{EP3}$ each independently represent a single bond or a divalent linking group. $L_{EP2}$ present in plural numbers in a case where n is 2 or more may be the same groups, or may be different groups.

In General Formula (CDN2-e), as the divalent linking group represented by $L_{EP1}$, $L_{EP2}$, and $L_{EP3}$, exemplified divalent linking groups represented by $L_{EP}$ in General Formula (CDN1-e) are similarly exemplified as, for example, preferable examples.

The polymer obtained by polymerizing the compound represented by General Formula (CDN1) may be, for example, a polymer obtained by three-dimensionally cross-linking and polymerizing at least three or more compounds represented by General Formula (CDN1) via or not via a linking group. Examples of the polymer obtained by three-dimensionally cross-linking and polymerizing the compound represented by General Formula (CDN1) include a compound represented by the following structural formula, for example.

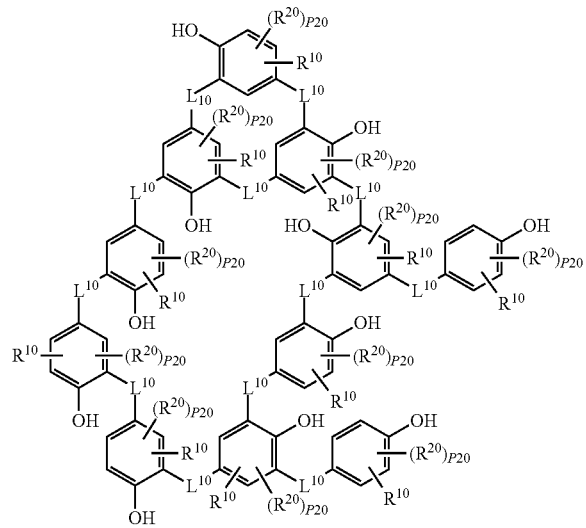

In the structural formula, $R^{10}$, $R^{20}$, and P20 each are the same as $R^1$, $R^2$, and P2 in General Formula (CDN1) $L^{10}$ represents a single bond or a divalent linking group. $R^{10}$, $R^{20}$, and $L^{10}$ present in plural numbers each may be the same groups, or may be different groups. P20 present in plural numbers may be the same numbers, or may be different numbers.

In the structural formula, the divalent linking group represented by $L^{10}$ includes an alkylene group that may have a substituent (for example, preferably an alkylene group having 2 or more and 30 or less carbon atoms, more preferably 5 or more and 20 or less carbon atoms), and the like.

Examples of the substituent include the same as exemplified as the substituent in $R^1$ of General Formula (CDN1).

The compound represented by the structural formula may be further modified, for example, may be epoxidized. Specifically, the compound may be a compound of a structure in which the hydroxy group of the compound represented by the structural formula is substituted with a group (EP), for example, a compound represented by the following structural formula, that is, a polymer obtained by three-dimensionally cross-linking and polymerizing the compound represented by General Formula (CDN1-e).

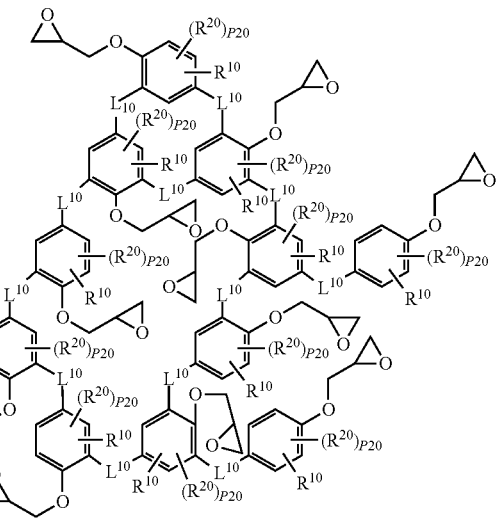

In the structural formula, $R^{10}$, $R^{20}$, and P20 are each independently the same as $R^1$, $R^2$, and P2 in General Formula (CDN1-e). $L^{10}$ represents a single bond or a divalent linking group. $R^{10}$, $R^{20}$, and $L^{10}$ present in plural numbers each may be the same groups, or may be different groups. P20 present in plural numbers may be the same numbers, or may be different numbers.

In the structural formula, the divalent linking group represented by $L^{10}$ includes an alkylene group that may have a substituent (for example, preferably an alkylene group having 2 or more and 30 or less carbon atoms, more preferably 5 or more and 20 or less carbon atoms), and the like.

Examples of the substituent include the same as exemplified as the substituent in $R^1$ of General Formula (CDN1).

The cardanol compound is, for example, preferably a cardanol compound having an epoxy group, from a viewpoint of improving the transparency of a resin molded body.

As the cardanol compound, a commercially available product may be used. Examples of the commercially available product include NX-2024, Ultra LITE 2023, NX-2026, GX-2503, NC-510, LITE 2020, NX-9001, NX-9004, NX-9007, NX-9008, NX-9201, and NX-9203, manufactured by Cardolite Corporation, LB-7000, LB-7250, and CD-5L, manufactured by Tohoku Chemical Industries, Ltd., and the like. Examples of the commercially available product of the cardanol compound having an epoxy group include NC-513, NC-514S, NC-547, LITE 513E, and Ultra LTE 513, manufactured by Cardolite Corporation, and the like.

A hydroxyl value of the cardanol compound is, for example, preferably 100 mgKOH/g or more, more preferably 120 mgKOH/g or more, and further more preferably 150 mgKOH/g or more, from a viewpoint of improving the biodegradation rate of the resin molded body. The hydroxyl value of the cardanol compound is measured by a method A of ISO14900.

In a case where a cardanol compound having an epoxy group is used as the cardanol compound, the epoxy equivalent thereof is, for example, preferably 300 or more and 500 or less, more preferably 350 or more and 480 or less, and further more preferably 400 or more and 470 or less, from a viewpoint of improving the transparency of the resin molded body. The epoxy equivalent of the cardanol compound having an epoxy group is measured in accordance with ISO3001.

A molecular weight of the cardanol compound is, for example, preferably 250 or more and 1,000 or less, more preferably 280 or more and 800 or less, and further more preferably 300 or more and 500 or less, from a viewpoint of improving the biodegradation rate of the resin molded body.

One cardanol compound may be used alone, or two or more thereof may be used in combination.

The ratio (B/A) of the plasticizer content (B) to the biodegradable resin content (A) is, for example, preferably 0.02 or more and 0.9 or less, more preferably 0.05 or more and 0.85 or less, and further more preferably 0.1 or more and 0.8 or less.

For example, by setting the content of the plasticizer within the above range, the flexibility of the resin particles is preferably easily improved.

Other Components

The mother particles may contain other components.

Examples of the other components include a flame retardant, a compatibilizer, a mold release agent, a light fastener, a weather resistant agent, a colorant, a pigment, a modifier, a drip inhibitor, an antistatic agent, a hydrolysis inhibitor, a filler, a reinforcing agent (glass fiber, carbon fiber, talc, clay, mica, glass flake, milled glass, glass beads, crystalline silica, alumina, silicon nitride, aluminum nitride, boron nitride, and the like), an acid acceptor to prevent acetic acid release (oxides such as magnesium oxide and aluminum oxide; metal hydroxides such as magnesium hydroxide, calcium hydroxide, aluminum hydroxide, and hydrotalcite; calcium carbonate; talc; and the like), a reactive trapping agent (for example, epoxy compound, acid anhydride compound, carbodiimides, and the like), and the like.

A content of the other components is, for example, preferably 0% by mass or more and 5% by mass or less, with respect to the total amount of the mother particles. Here, "0% by mass" means that other components are not contained.

The mother particles may contain resins other than the biodegradable resin. However, in a case of containing other resins, a content of other resins with respect to the total amount of the mother particles, for example, may be 5% by mass or less, and is preferably less than 1% by mass. Other resins are, for example, more preferably not contained (that is, 0% by mass).

Examples of other resins include known thermoplastic resins in the related art, specifically include a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyetherimide resin; a polyacetal resin; a polyvinyl acetal resin; a polyketone resin; a polyether ketone resin; a polyetherether ketone resin; a polyaryl ketone resin; a polyether nitrile resin; a liquid crystal resin; a polybenzimidazole resin; a polyparavanate resin; a vinyl polymer or copolymer obtained by polymerizing or copolymerizing one or more vinyl monomers selected from the group consisting of aromatic alkenyl compound, methacrylic acid ester, acrylic acid ester, and vinyl cyanide compound; diene-aromatic alkenyl compound copolymer; vinyl cyanide-diene-aromatic alkenyl compound copolymer; aromatic alkenyl compound-diene-vinyl cyanide-N-phenylmaleimide copolymer; vinyl cyanide-(ethylene-diene-propylene (EPDM))-aromatic alkenyl compound copolymer; vinyl chloride resin; chlorinated vinyl chloride resin; and the like. One of these resins may be used alone, or two or more thereof may be used in combination.

First Layer and Second Layer

The resin particles according to the present exemplary embodiment, for example, preferably have a first layer containing at least one cationic resin of polyalkyleneimine, polyallylamine, or polyvinylamine and a second layer containing an anionic or nonionic hydrophobic compound, on a surface of the mother particles, in this order.

By having the first layer and the second layer, the plasticizer is easily retained between the mother particle surface and the first layer and the second layer even in a case where the plasticizer exudes from the mother particles. Therefore, the exudation of the plasticizer from the resin particles is suppressed. Therefore, by having the first layer and the second layer, the resin particles easily become resin particles in which bleeding is further suppressed.

First Layer

The first layer is a resin layer on a surface of the mother particles. The first layer contains at least one cationic resin of polyalkyleneimine, polyallylamine, or polyvinylamine.

The cationic resin may be any of polyalkyleneimine, polyallylamine, or polyvinylamine, but polyalkyleneimine is, for example, preferable, from a viewpoint of improving the biodegradation rate over time and decreasing the initial biodegradation rate.

The polyalkyleneimine is, for example, preferably polyalkyleneimine having a structural unit including an alkylene group having 1 or more and 6 or less carbon atoms (for example, preferably 1 or more and 4 or less carbon atoms, more preferably 1 or more and 2 or less carbon atoms), and is more preferably polyethyleneimine, from a viewpoint of improving the biodegradation rate over time and decreasing the initial biodegradation rate.

In particular, polyethyleneimine is a compound having high adhesion and high water absorption. This is because an amino group of polyethyleneimine has a hydrogen bond with a hydroxyl group, an ionic bond with a carboxyl group, and a covalent bond with a carbonyl group. This is because polyethyleneimine has a polar group (amino group) and a hydrophobic group (ethylene group) in the structure, and therefore has a property of easily binding different substances.

In addition, polyethyleneimine is a compound having high cationic property. With this, polyethyleneimine is present as a polycation in water and neutralizes and adsorbs anionic substances.

In addition, polyethyleneimine is a compound having a highly reactive primary amino group or secondary amino group, and thus is a compound having high reactivity. With this, polyethyleneimine easily reacts with various compounds.

Therefore, in a case where polyethyleneimine is applied as the polyalkyleneimine, the second layer containing a hydrophobic compound is more strongly coated on the mother particles, and the initial biodegradation rate easily becomes slow while having the biodegradation rate over time.

A number average molecular weight of the cationic resin is, for example, preferably 300 or more and 100,000 or less, more preferably 10,000 or more and 85,000 or less, and further more preferably 50,000 or more and 80,000 or less, from a viewpoint of improving the biodegradation rate over time and decreasing the initial biodegradation rate.

The number average molecular weight of the cationic resin is measured by gel permeation chromatography (GPC apparatus: manufactured by Tosoh Corporation, HLC-8320GPC, column: TSKgel α-M) in terms of polystyrene using tetrahydrofuran.

Second Layer

The second layer is a compound layer on the first layer. The second layer contains an anionic or nonionic compound or a hydrophobic compound.

Examples of the anionic or nonionic compound or the hydrophobic compound include a hydrophobic compound having an anionic group (—COOH (carboxyl group), —SO3H (sulfone group), and the like), a hydrophobic compound not having a cationic group and an anionic group, and the like.

The hydrophobic compound indicates a compound that imparts hydrophobicity (specifically, a water contact angle) to the biodegradable resin particles described later.

Examples of the hydrophobic compound include silicone compound, hydrocarbon compound, fatty acid compound, acrylic resin, polyester resin, urethane resin, and the like.

Among these, from a viewpoint of improving the biodegradation rate over time and decreasing the initial biodegradation rate, at least one selected from the group consisting of a silicone compound, a hydrocarbon compound, a fatty acid compound, an acrylic resin, a polyester resin, and a urethane resin is, for example, preferable.

Examples of the silicone compound include dimethylpolysiloxane, methylpolysiloxane, octamethylcyclotetrasiloxane, decamethylcyclopentasiloxane, methylcyclopolysiloxane, and various modified silicone oils (alkyl-modified silicone oil, polyether-modified silicone oil, alcohol-modified silicone oil, fluorine-modified silicone oil, amino-modified silicone oil, and the like), MQ resin, silicone rubber, and the like.

Among these, the silicone compound is, for example, preferably at least one selected from the group consisting of dimethylpolysiloxane, methylpolysiloxane, MQ resin, and silicone rubber, from a viewpoint of improving the biodegradation rate over time and decreasing the initial biodegradation rate.

Here, the MQ resin indicates a silicone resin having an M unit that is a monofunctional siloxane unit [(CH3)3SiO1/2] and a Q unit that is a tetrafunctional siloxane unit [SiO4/2].

Examples of the commercially available silicone compound include a silicone compound (KM-902, KM-903, KM-910, KM-9729, POLON-MN-ST, KM-9737A, KM-9782, KM-9738A, KM-752T, POLON-MF-33, KM-9717, X-51-1302M (MQ resin), POLON-MF-56, KM-2002-L-1, KM-2002-T, KM-9772, KM-9749, POLON-MF-40, KM-9729, X-52-1133, and the like, manufactured by Shin-Etsu Chemical Co., Ltd.), and a silicone compound (BELSIL DM3112VP) manufactured by Wacker Asahikasei Silicone Co., Ltd.

Examples of the hydrocarbon compound include petroleum wax (paraffin wax, microcrystalline wax, petrolatum wax, and the like), synthetic hydrocarbon wax (polyethylene wax, polypropylene wax, polybutene wax, Fischer Tropsch wax, and the like), and the like.

Among these, from a viewpoint of improving the biodegradation rate over time and decreasing the initial biodegradation rate, the hydrocarbon compound is, for example, preferably at least one selected from the group consisting of paraffin wax, microcrystalline wax, polyethylene wax, and polypropylene wax.

Examples of the commercially available hydrocarbon compound include microcrystalline wax (EMUSTAR-0001 and the like) manufactured by Nippon Seiro Co., Ltd., paraffin wax (EMUSTAR-0135 and the like) manufactured by Nippon Seiro Co., Ltd., paraffin wax (AQUACER497 and the like) manufactured by BYK Co., Ltd., polyethylene wax (AQUACER507, AQUACER840, AQUACER1547, AQUACER272, and the like) manufactured by BYK Co., Ltd., polyethylene wax (Hitech E-2213, Hitech E-6324, and the like) manufactured by Toho Chemical Industry Co., Ltd., polypropylene wax (AQUACER593 and the like) manufactured by BYK Co., ltd., polypropylene (Hitech P-9018, Hitech P-5060P, and the like) manufactured by Toho Chemical Industry Co., Ltd., and the like.

Examples of the fatty acid compound include vegetable oils containing fatty acids (castor oil, tung oil, flaxseed oil, shortening, corn oil, soybean oil, sesame oil, rapeseed oil, sunflower oil, rice bran oil, *camellia* oil, coconut oil, palm oil, walnut oil, olive oil, peanut oil, almond oil, jojoba oil, cacao butter, shea butter, neem oil, safflower oil, wood wax, candelilla wax, rice wax, carnauba wax, and the like) and the like.

Among these, from a viewpoint of improving the biodegradation rate over time and decreasing the initial biodegradation rate, the fatty acid compound is, for example, preferably at least one selected from the group consisting of carnauba wax, rice wax, candelilla wax, palm wax, castor oil wax, soybean oil wax, sunflower oil wax, and the like.

Examples of the commercially available fatty acid compound include carnauba wax (EMUSTAR-0413) (carnauba wax) manufactured by Nippon Seiro Co., Ltd., rice wax (AQUASPROUT-7300 and the like) manufactured by Nippon Seiro Co., Ltd., palm wax (AQUASPROUT-7100 and the like) manufactured by Nippon Seiro Co., Ltd., castor oil wax (AQUASPROUT-7500 and the like) manufactured by Nippon Seiro Co., Ltd., soybean oil wax (AQUASPROUT-7200 and the like) manufactured by Nippon Seiro Co., Ltd., sunflower oil wax (AQUASPROUT-7400 and the like) manufactured by Nippon Seiro Co., Ltd., palm oil wax (Kakko Ace TKE and the like) manufactured by Nippon Seiro Co., Ltd., and the like.

Examples of the acrylic resin include known acrylic resins such as a polymer of acrylic acid and a polymer of an acrylic acid alkyl ester.

Examples of the commercially available acrylic resin include acrylic resins (3WX-2015, 3MF-320, 3MF-333, 3MF-407, and the like) manufactured by Taisei Fine Chemical Co., Ltd., acrylic resins (Coat SFC-6440, Boncoat CE-6270, Boncoat CE-6400, Boncoat CF-2800, and the like) manufactured by DIC Corporation, and the like.

Examples of the polyester resin include known polyester resins such as a polycondensate of a polyvalent carboxylic acid and a polyhydric alcohol, a ring-opened polycondensate of cyclic lactam, and the like.

Examples of the commercially available polyester resin include polyester resins (A-110F, A-160P, A-520, A-613D, A-615GE, A-640, A-645GH, A-647GEX, and the like) manufactured by Takamatsu Oil & Fat Co., Ltd., and the like.

Examples of the urethane resin include known urethane resins such as polyester-based polyurethane, polyether-based polyurethane, polycarbonate-based polyurethane, and the like. In addition, as the urethane resin, a material having a shell layer of a urethane polymer around the core of the acrylic polymer may be used.

Examples of the commercially available urethane resin include urethane resins (WEM-031U, WEM-200U, WEM-321U, WEM-3000, WBR-016U, WBR-2101, and the like) manufactured by Taisei Fine Chemical Co., Ltd. and the like.

Content of Each Layer

In the biodegradable resin particles according to the present exemplary embodiment, from a viewpoint of improving the biodegradation rate over time and decreasing the initial biodegradation rate, a mass ratio of a coating amount of the cationic resin in the first layer to a coating amount of the hydrophobic compound in the second layer (coating amount of cationic resin/coating amount of hydrophobic compound) is, for example, preferably 0.05 or more and 20 or less, more preferably 0.1 or more and 10 or less, and further more preferably 0.1 or more and 3 or less.

In addition, from the viewpoint of improving the biodegradation rate over time and decreasing the initial biodegradation rate, the content of the cationic resin with respect to the mother particles is, for example, preferably 0.05% by mass or more and 15% by mass or less, more preferably 0.1% by mass or more and 10% by mass or less, and further more preferably 0.1% by mass or more and 3% by mass or less.

In addition, from a viewpoint of improving the biodegradation rate over time and decreasing the initial biodegradation rate, a content of the hydrophobic compound with respect to the mother particles is, for example, preferably 0.05% by mass or more and 15% by mass or less, more preferably 0.1% by mass or more and 10% by mass or less, and further more preferably 0.1% by mass or more and 3% by mass or less.

Here, each coating amount of the cationic resin and the hydrophobic compound (that is, each coating amount of the first layer and the second layer) is measured as follows. The coating amount of the cationic resin is obtained by a difference between a treated amount of the cationic resin and the cationic resin obtained by drying a supernatant after the treatment. Similarly, the coating amount of the hydrophobic compound is obtained by the difference between the treated amount of the hydrophobic compound and the hydrophobic compound obtained by drying the supernatant after the treatment.

Properties of Resin Particles

Particle Size

A volume average particle size of the resin particles is, for example, preferably 3 μm or more and 100 μm or less, more preferably 5 μm or more and 70 μm or less, and further more preferably 8 μm or more and 60 μm or less.

A large-diameter volume particle size distribution index GSDv of the biodegradable resin particles is, for example, preferably 1.5 or less, more preferably 1.3 or less, and further more preferably 1.2 or less.

The volume average particle size and the large-diameter volume particle size distribution index GSDv of the biodegradable resin particles are measured as follows.

A particle size is measured by an LS particle size distribution measuring apparatus "Beckman Coulter LS13 320 (manufactured by Beckman Coulter)", the cumulative distribution of the particle size is drawn from a small diameter side on a volume basis, and the particle size that becomes 50% of accumulation is obtained as the volume average particle size.

On the other hand, the cumulative distribution of particle size is drawn from the small diameter side on a volume basis, and the particle size that becomes 50% of accumulation is defined as a volume average particle size D50v, and the particle size that becomes 84% of accumulation is defined as a volume average particle size D84v. Then, the large-diameter volume particle size distribution index GSDv is calculated by Formula $GSDv=D84v/D50v$.

Specific Element Amount

An amount of the metal element (specific metal element) having an ionic valence of 2 or more, obtained by fluorescent X-ray analysis, is 0.002% by mass or more and 2.0% by mass or less with respect to the total amount of the resin particles.

The amount of the specific metal element is measured by the following procedure.

Using a fluorescent X-ray analyzer (XRF 1500, manufactured by Shimadzu Corporation), qualitative and quantitative analysis measurements are performed under the conditions of an X-ray output of 40 V, 70 mA, a measurement area of 10 mmcp, and a measurement time of 15 minutes. Here, the elements to be analyzed are all the elements present in a measurement region. Then, an atomic weight of all the elements present in the measurement region and an atomic weight of the specific metal element are calculated respectively. Subsequently, the atomic weights of all the elements present in the measurement region and the atomic weight of the specific metal elements are converted into masses, respectively. Then, the percentage of the mass of the specific metal element with respect to the mass of all the elements present in the measurement region is calculated and used as the amount of the specific metal element obtained by fluorescent X-ray analysis.

From a viewpoint of producing resin particles in which bleeding in a case of storage for a long period of time under a high temperature condition is suppressed while maintaining more flexibility, the amount of the specific metal element, obtained by fluorescent X-ray analysis, is, for example, preferably 0.02% by mass or more and 1.5% by mass or less, more preferably 0.1% by mass or more and 1.2% by mass or less, and further more preferably 0.2% by mass or more and 1.0% by mass or less with respect to the total amount of the resin particles.

The specific element is not particularly limited as long as the specific element is a metal element having an ionic valence of 2 or more, and examples thereof include a metal element of Group 2 of the periodic table such as Mg and Ca; a metal element of Group 12 of the periodic table such as zinc; a metal element of Group 13 of the periodic table such as Al; a metal element of Group 14 of the periodic table such as Si; a transition metal element such as Fe, Ti, Zr and the like.

The specific metal element is not limited and preferably includes at least one selected from the group consisting of Ca, Mg, Al, and Fe, and more preferably includes Ca.

Among the specific metal elements, Ca, Mg, Al, and Fe are easily bonded to a functional group of the biodegradable resin. Thus, the resin particles easily have a crosslinked structure. Among these, Ca has a relatively large ionic radius, and thus is more easily bonded to the functional group of the biodegradable resin. Therefore, the resin particles become resin particles in which bleeding in a case of storage for a long period of time under a high temperature condition is suppressed while maintaining more flexibility.

Ratio (Rs/Rp)

The ratio (Rs/Rp) of the circle-equivalent diameter Rs of the aggregate to the circle-equivalent diameter Rp of the primary particle after storage for 3 months under the conditions of 50° C. and 50% RH is less than 1.5.

From a viewpoint of further suppressing bleeding in a case of storage for a long period of time under a high temperature condition, the ratio (Rs/Rp) is, for example, preferably 1.4 or less, more preferably 1.3 or less, and further more preferably 1.2 or less.

A lower limit of the ratio (Rs/Rp) is, for example, preferably 1.0 or more.

The circle-equivalent diameter Rs of the aggregate and the circle-equivalent diameter Rp of the primary particle are calculated as follows.

First, the resin particles are stored in a chamber at a temperature of 50° C. and a humidity of 50% for 3 months. The aggregate present in the resin particles after storage is observed with a scanning electron microscope (SEM) apparatus (manufactured by Hitachi, Ltd.: S-4100), an image is captured, and the image is taken into an imageanalyzer (LUZEXIII, manufactured by Nireco Co., Ltd.). An area of each aggregate is measured by image analysis, and the circle-equivalent diameter is calculated from the area value. The circle-equivalent diameter of the aggregate is calculated for 100 aggregates. Then, an arithmetic mean value of the circle-equivalent diameter calculated from 100 aggregates is defined as the circle-equivalent diameter Rs of the aggregate. Then, the calculation of the circle-equivalent diameter Rp of the primary particle present in the resin particles after storage is also measured by the same procedure as the circle-equivalent diameter Rs of the aggregate.

Here, the aggregate and the primary particles present in the resin particles after storage are determined as follows. In the image obtained by observing the resin particles after storage with an SEM apparatus, a resin particle present alone is defined as a primary particle. Two or more resin particles being present in contact with each other are defined as an aggregate.

Durometer Hardness

A durometer hardness is less than 75.

From a viewpoint of further improving the flexibility, the durometer hardness is, for example, preferably 30 or more and 74 or less, more preferably 40 or more and 70 or less, and further more preferably 50 or more and 65 or less.

The durometer hardness is specified as follows.

The resin particles are heated at 200° C., and then molded into a disk having a thickness of 2 mm. The obtained disk is used as a measurement subject, and measurement is performed using a type D durometer under a measurement load of 5,000 g. The durometer hardness is measured in accordance with JIS K 7215:1986.

Method for Producing Resin Particles

Examples of a method for producing resin particles include the following methods.

(1) A kneading and pulverizing method of obtaining granules by kneading each component, and pulverizing and classifying obtained kneaded matters (2) A dry production method of obtaining granules by changing a shape of the granules obtained by the kneading and pulverizing method with a mechanical impact force or thermal energy (3) An aggregation and coalescence method of obtaining granules by mixing a particle dispersion solution of each component, and aggregating and heat-fusing particles in the dispersion solution (4) A dissolution suspension method of granulating granules including each component by suspending an organic solvent in which each component is dissolved in an aqueous solvent (5) A kneading and dissolution method of granulating by kneading each component and a binder, extruding thereof into pellets, and agitating the obtained pellets in a solvent dissolving only the binder As a method for producing the resin particles, the method of (4) is, for example, preferable, from a viewpoint that the amount of the specific metal element, obtained by fluorescent X-ray analysis, is set to 0.002% by mass or more and 2.0% by mass or less with respect to the total amount of the resin particles.

In the production of the resin particles by the method of (4), it is, for example, preferable to dissolve the metal element source containing the specific metal element in an aqueous solvent in advance before suspending an organic solvent in which each component is dissolved in the aqueous solvent.

Examples of the metal element source include carbonate containing a specific metal element, hydroxide containing a specific metal element, and the like.

Examples of the carbonate containing a specific metal element include calcium carbonate, magnesium carbonate, aluminum carbonate, iron carbonate, and the like.

Examples of the hydroxide containing a specific metal element include calcium hydroxide, magnesium hydroxide, aluminum hydroxide, iron hydroxide, and the like.

A content of the metal element source of the aqueous solvent is, for example, preferably 1% by mass or more and 20% by mass or less, more preferably 2% by mass or more and 15% by mass or less, further more preferably 3% by mass or more and 10% by mass or less with respect to the total amount of the aqueous solvent.

Examples of the method for producing the resin particles having the first layer and the second layer include the following methods, for example.

First Step

In First step, mother particles are prepared.

Examples of the method for producing mother particles include methods (1) to (5) for producing the resin particles.

Subsequently, an aqueous dispersion solution in which the obtained mother particles are dispersed is prepared. Before preparing the aqueous dispersion solution, acid washing of the mother particles may be, for example, performed.

Subsequently, the aqueous dispersion solution, and an aqueous solution containing an aqueous dispersion solution in which the mother particles are dispersed and an aqueous solution containing a cationic resin are mixed with each other. With this, for example, a hydroxyl group of the resin contained in the mother particles reacts with an amine site of the cationic resin to form a first layer.

Second Step

In Second step, the mother particles on which the first layer is formed are extracted from the mixed solution. The extraction of the mother particles is, for example, performed by filtering the mixed solution. The extracted mother particles may be, for example, washed with water. With this, an unreacted cationic resin is removed.

Subsequently, after preparing the aqueous dispersion solution in which the mother particles are dispersed, the aqueous dispersion solution and an emulsion solution of an anionic or nonionic hydrophobic compound are mixed with each other. With this, the emulsion of the hydrophobic compound is adsorbed on the first layer of the mother particles.

Thereafter, in a case where the mixed solution is dried, the emulsion of the hydrophobic compound is broken, and the hydrophobic compound is filmed on the first layer. With this, a second layer is formed.

By the above steps, the resin particles according to the present exemplary embodiment are obtained.

Use

Examples of the use of the resin particles according to the present exemplary embodiment include cosmetic base materials, rolling materials, abrasives, scrubbing agents, display spacers, beads molding materials, light diffusing particles, resin strengthening agents, refractive index control agents, biodegradation accelerators, fertilizers, water-absorbent particles, toner particles, granules of anti-blocking particles, and the like.

EXAMPLES

Examples will be described below, but the present invention is not limited to these examples. In the following description, unless otherwise specified, "parts" and "%" are all based on mass.

Preparation of Each Material

The following materials are prepared.

Biodegradable Resin

CAB: Eastman Chemical "CAB381-20", cellulose acetate butyrate, weight average polymerization degree 890, acetyl group substitution degree 1.05, butyryl group substitution degree 1.74

CAP: Eastman Chemical "CAP482-20", cellulose acetate propionate, weight average polymerization degree 716, acetyl group substitution degree 0.18, propionyl group substitution degree 2.49

PLA: Polylactic acid, weight average molecular weight 180,000

PBS: Polybutylene succinate, weight average molecular weight 200,000

DAC: "L-50" manufactured by Daicel Corporation, cellulose diacetate, weight average polymerization degree 570

TAC: "LT-35" manufactured by Daicel Corporation, cellulose triacetate, weight average polymerization degree 385

Plasticizer

DIBA: Diisobutyl adipate

ATBC: Tributyl 0-acetyl citrate

CDN: "NX-2503" manufactured by Cardolite Corporation, hydroxyethylated cardanol, molecular weight 296 to 320

Cationic Resin of First Layer

PEI: Polyethyleneimine, number average molecular weight 70,000

PAA: Polyallylamine, number average molecular weight 25,000

PVAM: Polyvinylamine, number average molecular weight 100,000

Anionic or Nonionic Hydrophobic Compound of Second Layer

EMUSTAR-0413: Carnauba wax manufactured by Nippon Seiro Co., Ltd., anionic

EMUSTAR-0136: Paraffin wax, nonionic, manufactured by Nippon Seiro Co., Ltd.

Examples 1 to 11, 14 to 21, Comparative Examples 1, 2, 4 to 6

Preparation of Resin Pellets

A cylinder temperature is adjusted at a charged composition ratio shown in Table 1, and kneading is performed with a twin-screw kneader (TEX41SS manufactured by Toshiba Machine Co., Ltd.) to obtain a pellet-shaped resin composition (hereinafter, referred to as resin pellet)

Preparation of Resin Particles 300 g of resin pellets are completely dissolved in 700 g of methyl ethyl ketone. This is added to an aqueous liquid obtained by dispersing 50 g of the metal element source shown in Table 1 in 500 g of pure water, and the mixture is agitated for 3 hours. Subsequently, this is added to an aqueous liquid obtained by dispersing 4 g of carboxymethyl cellulose and 200 g of methyl ethyl ketone in 600 g of pure water, and the mixture is agitated with a high-speed emulsifier for 5 minutes. This is added with 10 g of sodium hydroxide, and the mixture is heated to 80° C. and agitated for 3 hours to remove methyl ethyl ketone. Subsequently, 10 g of dilute hydrochloric acid is added to dissolve the metal element source. After filtering the residue, the solid content is freeze-dried to obtain resin particles.

Examples 12, 13, 22 to 24, Comparative Example 3

Preparation of Resin Pellets

A cylinder temperature is adjusted at a charged composition ratio shown in Table 1, and kneading is performed with a twin-screw kneader (TEX41SS manufactured by Toshiba Machine Co., Ltd.) to obtain a pellet-shaped resin composition (hereinafter, referred to as resin pellet)

Preparation of Mother Particles 300 g of resin pellets are completely dissolved in 700 g of methyl ethyl ketone. This is added to an aqueous liquid obtained by dispersing 50 g of the metal element source shown in Table 1 in 500 g of pure water, and the mixture is agitated for 3 hours. Subsequently, this is added to an aqueous liquid obtained by dispersing 4 g of carboxymethyl cellulose and 200 g of methyl ethyl ketone in 600 g of pure water, and the mixture is agitated with a high-speed emulsifier for 5 minutes. This is added with 10 g of sodium hydroxide, and the mixture is heated to 80° C. and agitated for 3 hours to remove methyl ethyl ketone. Subsequently, 10 g of dilute hydrochloric acid is added to dissolve the metal element source. After filtering the residue, the resultant product is dispersed in pure water again to obtain a slurry of mother particles.

Preparation of Resin Particles

Using the materials of the first layer and the second layer shown in Table 1, biodegradable resin particles are obtained as follows.

500 parts of a slurry of mother particles adjusted to have a solid content of 20% are prepared. A cationic resin solution in the amount shown in Table 1 is added to the solid content (100 parts) contained in this slurry in terms of pure content, and the mixture is agitated under a condition of 25° C. for 1 hour. After the agitating is completed, the residue is filtered and dispersed in pure water again to prepare 500 parts adjusted to have the solid content of 20%. A hydrophobic compound in the amount shown in Table 1 is added to the solid content (100 parts) contained in this slurry in terms of pure content and is agitated under a condition of 25° C. for 1 hour. After the agitating is completed, the residue is filtered and the solid content is freeze-dried to obtain biodegradable resin particles.

Through the above steps, biodegradable resin particles are obtained.

Evaluation

With respect to the obtained resin particles, a ratio (Rs/Rp) of a circle-equivalent diameter Rs of an aggregate to a circle-equivalent diameter Rp of a primary particle, after storage for 3 months under conditions of the amount of the metal element having an ionic valence of 2 or more ("metal element amount" in the table), the volume average particle diameter D50v, the durometer hardness, and 50° C. and 50% RH, obtained by fluorescent X-ray analysis, is measured by the above-described method. The results are shown in Table 2.

Flexibility Evaluation

Using the measured durometer hardness value, the flexibility of the resin particles is evaluated based on the following evaluation criteria. The results are shown in Table 2.

Evaluation Criteria
G1 (A): Durometer hardness ≤65
G2 (B): 65<durometer hardness <75
G3 (C): 75≤durometer hardness Evaluation of long-term thermal storage properties Using the value of the calculated ratio (Rs/Rp), the long-term thermal storage properties of the resin particles are evaluated based on the following evaluation criteria. The results are shown in Table 2.

Evaluation Criteria
G1 (A): Ratio (Rs/Rp)≤1.2
G2 (B): 1.2<ratio (Rs/Rp)<1.5
G3 (C): 1.5≤ratio (Rs/Rp)

TABLE 1

| | Resin pellet | | | | | | | |
|---|---|---|---|---|---|---|---|---|
| | Biodegradable resin | | Plasticizer | | | First layer | | Second layer | |
| Examples | Material | Amount (A)/parts by mass | Material | Amount (B)/parts by mass | Ratio (B)/(A) | Material | Amount/ parts by mass | Material | Amount/ parts by mass |
| Example 1 | CAB | 100 | DIBA | 20 | 0.2 | — | — | — | — |
| Example 2 | CAB | 100 | DIBA | 20 | 0.2 | — | — | — | — |
| Example 3 | CAB | 100 | ATBC | 30 | 0.3 | — | — | — | — |
| Example 4 | CAB | 100 | ATBC | 30 | 0.3 | — | — | — | — |
| Example 5 | CAB | 100 | ATBC | 30 | 0.3 | — | — | — | — |
| Example 6 | CAP | 100 | CDN | 30 | 0.3 | — | — | — | — |
| Example 7 | CAP | 100 | CDN | 30 | 0.3 | — | — | — | — |
| Example 8 | CAP | 100 | CDN | 20 | 0.2 | — | — | — | — |
| Example 9 | CAP | 100 | CDN | 20 | 0.2 | — | — | — | — |
| Example 10 | PLA | 100 | DIBA | 20 | 0.2 | — | — | — | — |
| Example 11 | PBS | 100 | DIBA | 20 | 0.2 | — | — | — | — |
| Example 12 | CAB | 100 | DIBA | 20 | 0.2 | PEI | 1 | EMUSTAR-0413 | 2 |
| Example 13 | CAP | 100 | CDN | 30 | 0.3 | PEI | 1 | EMUSTAR-0413 | 2 |
| Comparative Example 1 | PBS | 100 | — | — | — | — | — | — | — |
| Comparative Example 2 | CAB | 100 | DIBA | 20 | 0.2 | — | — | — | — |
| Comparative Example 3 | CAP | 100 | CDN | 30 | 0.3 | PEI | 1 | EMUSTAR-0413 | 2 |
| Comparative Example 4 | CAP | 100 | CDN | 30 | 0.3 | — | — | — | — |
| Comparative Example 5 | CAP | 100 | CDN | 30 | 0.3 | — | — | — | — |
| Comparative Example 6 | DAC | 100 | ATBC | 40 | 0.4 | — | — | — | — |
| Example 14 | DAC | 100 | ATBC | 40 | 0.4 | — | — | — | — |
| Example 15 | CAB | 100 | DIBA | 20 | 0.2 | — | — | — | — |
| Example 16 | DAC | 100 | DIBA | 40 | 0.4 | — | — | — | — |
| Example 17 | TAC | 100 | DIBA | 40 | 0.4 | — | — | — | — |
| Example 18 | CAB | 100 | DIBA | 5 | 0.05 | — | — | — | — |
| Example 19 | CAB | 100 | DIBA | 10 | 0.1 | — | — | — | — |
| Example 20 | CAB | 100 | DIBA | 80 | 0.8 | — | — | — | — |
| Example 21 | CAB | 100 | DIBA | 85 | 0.85 | — | — | — | — |
| Example 22 | CAP | 100 | CDN | 30 | 0.3 | PAA | 1 | EMUSTAR-0413 | 2 |
| Example 23 | CAP | 100 | CDN | 30 | 0.3 | PVAM | 1 | EMUSTAR-0413 | 2 |
| Example 24 | CAP | 100 | CDN | 30 | 0.3 | PEI | 1 | EMUSTAR-0136 | 2 |

TABLE 2

| Examples | Metal element source | Type of metal element | Metal element amount/ mass % | D50v/ um | Durometer hardness | Rs/Rp | Flexibility evaluation | Long-term thermal storage properties evaluation |
|---|---|---|---|---|---|---|---|---|
| Example 1 | Calcium carbonate | Ca | 0.002 | 7 | 60 | 1.3 | AG1 | BG2 |
| Example 2 | Calcium carbonate | Ca | 0.2 | 8 | 60 | 1.1 | AG1 | AG1 |
| Example 3 | Calcium carbonate | Ca | 0.5 | 10 | 60 | 1.1 | AG1 | AG1 |
| Example 4 | Calcium carbonate | Ca | 1.0 | 9 | 60 | 1.1 | AG1 | AG1 |
| Example 5 | Calcium carbonate | Ca | 2.0 | 7 | 67 | 1.2 | BG2 | AG1 |
| Example 6 | Calcium carbonate | Ca | 0.5 | 30 | 55 | 1.1 | AG1 | AG1 |
| Example 7 | Magnesium carbonate | Mg | 0.5 | 9 | 55 | 1.3 | AG1 | BG2 |
| Example 8 | Aluminum hydroxide | Al | 0.5 | 8 | 60 | 1.3 | AG1 | BG2 |
| Example 9 | Iron hydroxide | Fe | 0.5 | 8 | 60 | 1.3 | AG1 | BG2 |
| Example 10 | Calcium carbonate | Ca | 0.3 | 40 | 70 | 1.4 | BG2 | BG2 |
| Example 11 | Calcium carbonate | Ca | 0.5 | 50 | 70 | 1.4 | BG2 | BG2 |
| Example 12 | Calcium carbonate | Ca | 0.8 | 9 | 60 | 1.1 | AG1 | AG1 |
| Example 13 | Calcium carbonate | Ca | 0.8 | 8 | 55 | 1.1 | AG1 | AG1 |
| Comparative Example 1 | Calcium carbonate | Ca | 0.5 | 7 | 80 | 1.2 | CG3 | AG1 |
| Comparative Example 2 | — | — | — | 8 | 60 | 1.6 | AG1 | CG3 |
| Comparative Example 3 | — | — | — | 10 | 60 | 1.5 | AG1 | CG3 |
| Comparative Example 4 | Calcium carbonate | Ca | 0.001 | 8 | 60 | 1.5 | AG1 | CG3 |
| Comparative Example 5 | Calcium carbonate | Ca | 3 | 7 | 75 | 1.1 | CG3 | AG1 |
| Comparative Example 6 | Sodium carbonate | Na | 0.3 | 18 | 60 | 1.5 | AG1 | CG3 |
| Example 14 | Barium carbonate | Ba | 0.3 | 25 | 60 | 1.4 | AG1 | BG2 |
| Example 15 | Calcium carbonate | Ca | 0.3 | 60 | 60 | 1.2 | AG1 | AG1 |
| Example 16 | Calcium carbonate | Ca | 0.3 | 11 | 60 | 1.1 | AG1 | AG1 |
| Example 17 | Calcium carbonate | Ca | 0.3 | 9 | 70 | 1.3 | BG2 | BG2 |
| Example 18 | Calcium carbonate | Ca | 0.3 | 100 | 74 | 1.1 | BG2 | AG1 |
| Example 19 | Calcium carbonate | Ca | 0.3 | 100 | 67 | 1.1 | AG1 | AG1 |
| Example 20 | Calcium carbonate | Ca | 0.3 | 100 | 55 | 1.1 | AG1 | AG1 |
| Example 21 | Calcium carbonate | Ca | 0.3 | 100 | 50 | 1.3 | AG1 | BG2 |
| Example 22 | Calcium carbonate | Ca | 0.3 | 20 | 55 | 1.2 | AG1 | AG1 |
| Example 23 | Calcium carbonate | Ca | 0.3 | 20 | 55 | 1.2 | AG1 | AG1 |
| Example 24 | Calcium carbonate | Ca | 0.3 | 20 | 55 | 1.2 | AG1 | AG1 |

From the above results, it is recognized that the resin particles of the present example are resin particles in which bleeding in a case of storage for a long period of time under a high temperature condition is suppressed while maintaining flexibility.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Resin particles comprising:
mother particles containing a biodegradable resin and a plasticizer,
wherein an amount of a metal element having an ionic valence of 2 or more, obtained by fluorescent X-ray analysis, is 0.002% by mass or more and 2.0% by mass or less with respect to a total amount of the resin particles.

2. The resin particles according to claim 1,
wherein the metal element having an ionic valence of 2 or more includes at least one selected from the group consisting of Ca, Mg, Al, and Fe.

3. The resin particles according to claim 2,
wherein the metal element having an ionic valence of 2 or more includes Ca.

4. The resin particles according to claim 3,
wherein the biodegradable resin is cellulose acylate.

5. The resin particles according to claim 4,
wherein the cellulose acylate is at least one selected from the group consisting of cellulose diacetate, cellulose acetate propionate, and cellulose acetate butyrate.

6. The resin particles according to claim 5,
wherein a ratio (B/A) of a content (B) of the plasticizer to a content (A) of the biodegradable resin is 0.1 or more and 0.8 or less.

7. The resin particles according to claim 4,
wherein a ratio (B/A) of a content (B) of the plasticizer to a content (A) of the biodegradable resin is 0.1 or more and 0.8 or less.

8. The resin particles according to claim 3,
wherein a ratio (B/A) of a content (B) of the plasticizer to a content (A) of the biodegradable resin is 0.1 or more and 0.8 or less.

9. The resin particles according to claim 2,
wherein the biodegradable resin is cellulose acylate.

10. The resin particles according to claim 9,
wherein the cellulose acylate is at least one selected from the group consisting of cellulose diacetate, cellulose acetate propionate, and cellulose acetate butyrate.

11. The resin particles according to claim 10,
wherein a ratio (B/A) of a content (B) of the plasticizer to a content (A) of the biodegradable resin is 0.1 or more and 0.8 or less.

12. The resin particles according to claim 9,
wherein a ratio (B/A) of a content (B) of the plasticizer to a content (A) of the biodegradable resin is 0.1 or more and 0.8 or less.

13. The resin particles according to claim 2,
wherein a ratio (B/A) of a content (B) of the plasticizer to a content (A) of the biodegradable resin is 0.1 or more and 0.8 or less.

14. The resin particles according to claim 1,
wherein the biodegradable resin is cellulose acylate.

15. The resin particles according to claim 14,
wherein the cellulose acylate is at least one selected from the group consisting of cellulose diacetate, cellulose acetate propionate, and cellulose acetate butyrate.

16. The resin particles according to claim 15,
wherein a ratio (B/A) of a content (B) of the plasticizer to a content (A) of the biodegradable resin is 0.1 or more and 0.8 or less.

17. The resin particles according to claim 14,
wherein a ratio (B/A) of a content (B) of the plasticizer to a content (A) of the biodegradable resin is 0.1 or more and 0.8 or less.

18. The resin particles according to claim 1,
wherein a ratio (B/A) of a content (B) of the plasticizer to a content (A) of the biodegradable resin is 0.1 or more and 0.8 or less.

19. The resin particles according to claim 1, further comprising:
a first layer containing at least one cationic resin of polyalkyleneimine, polyallylamine, or polyvinylamine on a surface of the mother particles; and
a second layer containing an anionic or nonionic hydrophobic compound, in this order.

20. Resin particles comprising:
mother particles containing a biodegradable resin and a plasticizer,
wherein a ratio (Rs/Rp) of a circle-equivalent diameter Rs of an aggregate to a circle-equivalent diameter Rp of a primary particle after storage for 3 months under a condition of 50° C. and 50% RH is less than 1.5, and a durometer hardness is less than 75.

* * * * *